US011052746B2

(12) United States Patent
Yu et al.

(10) Patent No.: US 11,052,746 B2
(45) Date of Patent: Jul. 6, 2021

(54) HORIZONTAL DRIVE ASSEMBLY OF DUAL POWER SOURCE VEHICLE

(71) Applicant: JING-JIN ELECTRIC TECHNOLOGIES CO., LTD., Beijing (CN)

(72) Inventors: Ping Yu, Beijing (CN); Changqi Yang, Beijing (CN); Jianwen Li, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 68 days.

(21) Appl. No.: 16/479,125

(22) PCT Filed: Dec. 12, 2017

(86) PCT No.: PCT/CN2017/115670
§ 371 (c)(1),
(2) Date: Jul. 18, 2019

(87) PCT Pub. No.: WO2018/137423
PCT Pub. Date: Aug. 2, 2018

(65) Prior Publication Data
US 2019/0389299 A1 Dec. 26, 2019

(30) Foreign Application Priority Data
Jan. 24, 2017 (CN) ......................... 201710059995.2

(51) Int. Cl.
*B60K 6/40* (2007.10)
*B60K 17/02* (2006.01)
(Continued)

(52) U.S. Cl.
CPC ................ *B60K 6/40* (2013.01); *B60B 35/14* (2013.01); *B60K 6/26* (2013.01); *B60K 6/36* (2013.01);
(Continued)

(58) Field of Classification Search
CPC ... B60K 6/40; B60K 6/26; B60K 6/36; B60K 6/387; B60K 17/02; B60K 17/16; B60B 35/14
(Continued)

(56) References Cited

U.S. PATENT DOCUMENTS 8,608,615 B2 * 12/2013 Fuechtner ................ B60K 6/48 477/3
9,297,441 B2 * 3/2016 Wechs ..................... B60K 6/48
(Continued)

FOREIGN PATENT DOCUMENTS

CN 104290587 A 1/2015
CN 104595450 A 5/2015
(Continued)

*Primary Examiner* — John D Walters
(74) *Attorney, Agent, or Firm* — LKGlobal | Lorenz & Kopf, LLP

(57) ABSTRACT

A vehicle drive assembly with transverse dual-power-source, comprising two power sources and an automatic transmission. The automatic transmission has a first input shaft and a second input shaft, and the two power sources are respectively connected to the two input shafts; a first intermediate shaft is provided parallel to the first input shaft, a second intermediate shaft is provided coaxial with the first input shaft, a third intermediate shaft is provided coaxial with the first intermediate shaft, and a first gear and a second gear on the first intermediate shaft are in engaged transmission; a third gear shaft and a fourth gear on the second intermediate shaft are in engaged transmission; and a fifth gear and a sixth gear on the third intermediate shaft are in
(Continued)

engaged transmission, and the sixth gear is simultaneously in engaged transmission with a seventh gear on a differential.

13 Claims, 2 Drawing Sheets

(51) Int. Cl.

| | |
|---|---|
| ***B60B 35/14*** | (2006.01) |
| ***B60K 6/26*** | (2007.10) |
| ***B60K 6/36*** | (2007.10) |
| ***B60K 6/387*** | (2007.10) |
| ***B60K 17/16*** | (2006.01) |

(52) U.S. Cl.
CPC .............. *B60K 6/387* (2013.01); *B60K 17/02* (2013.01); *B60K 17/16* (2013.01); *B60Y 2200/91* (2013.01); *B60Y 2200/92* (2013.01); *B60Y 2400/80* (2013.01)

(58) Field of Classification Search
USPC .......................................................... 180/292
See application file for complete search history.

(56) References Cited

U.S. PATENT DOCUMENTS

| | | | | |
|---|---|---|---|---|
| 9,568,082 | B2 * | 2/2017 | Yang | B60K 6/387 |
| 2012/0006153 | A1 * | 1/2012 | Imamura | B60K 6/54 74/665 A |
| 2016/0137045 | A1 * | 5/2016 | Zhu | F16H 37/0806 475/5 |
| 2017/0008510 | A1 | 1/2017 | Imamura et al. | |

FOREIGN PATENT DOCUMENTS

| | | | |
|---|---|---|---|
| CN | 204367890 | U | 6/2015 |
| CN | 106274461 | A | 1/2017 |
| CN | 106523629 | A | 3/2017 |
| CN | 106627078 | A | 5/2017 |
| CN | 106740024 | A | 5/2017 |
| CN | 106882041 | A | 6/2017 |
| CN | 206280446 | U | 6/2017 |
| CN | 206678782 | U | 11/2017 |
| CN | 206797095 | U | 12/2017 |
| DE | 102015206190 | A1 | 10/2016 |
| JP | 2007010158 | A | 1/2007 |
| JP | 2015212127 | A | 11/2015 |
| WO | 2011055050 | A1 | 5/2011 |

* cited by examiner

HORIZONTAL DRIVE ASSEMBLY OF DUAL POWER SOURCE VEHICLE

CROSS-REFERENCE TO RELATED APPLICATION

This Application is a U.S. National-Stage entry under 35 U.S.C. § 371 based on International Application No. PCT/CN2017/115670, filed Dec. 12, 2017 which was published under PCT Article 21(2) and which claims priority to Chinese Application No. 201710059995.2, filed Jan. 24, 2017, which are all hereby incorporated herein in their entirety by reference.

TECHNICAL FIELD

This Application pertains to a vehicle driving assembly with transverse dual-power-source, connected to a front axle or rear axle of a vehicle, for driving the vehicle.

BACKGROUND

In current purely electrical driven or hybrid power new energy automobiles, the dynamic characteristics of the employed electric motors deviate from the requirements of the entire vehicle, and cannot satisfy the requirements of speed ratio and moment. Because new energy automobiles are required to face increasingly complicated working conditions and road conditions, and the users are having increasingly higher requirements on the comfort degree and the endurance mileage of new energy automobiles, the new energy automobiles of simple electric motor directly driving mode, electric-motor-connected-to-speed-reducer mode or oil-electricity hybrid power mode cannot satisfy the demands on the development of the new energy automobile industry.

In the current vehicle power assemblies, the power source, the clutch, the gearbox or speed reducer, and the driving shaft are generally longitudinally arranged, which has a large length and occupies a large vehicle room, and is not applicable to some miniature vehicles that require a compact structure.

Furthermore, in current purely electrical driven or hybrid power new energy automobiles, speed reducers cannot use conventional friction clutches because the shock of the rotor shaft of the electric motor is large (the rotor shaft and the input shaft are not integrated), and the used clutch can only be in the way of hard connection, and does not possess cushioning effect, which cannot satisfy the requirements of new energy automobiles.

In the existing automobiles of the electric motor directly driving mode, the power system does not have clutch function, the conventional inertia friction synchronizers cannot be used, and the transmission cannot shift gears and can only use a single speed ratio. The startup and stopping of the entire vehicle can only rely on the startup and stopping of the electric motor, which affects the performance of the electric motor. In addition, other objects, desirable features and characteristics will become apparent from the subsequent summary and detailed description, and the appended claims, taken in conjunction with the accompanying drawings and this background.

SUMMARY

Aiming at the above problems of the prior art, the present disclosure provides a vehicle drive assembly with transverse dual-power-source, to solve the problem of single speed ratio transmission of the existing power assemblies, which cannot be adapted for complicated road conditions and working conditions.

Additionally, the present disclosure is to solve the problems of the existing power assemblies that the longitudinal dimension is large, which cannot be used in vehicles of a compact structure, and that the quantity of the gears in the transmission is larger and thus the transmission structure is complicated.

To achieve the above objects, the technical solutions of the present disclosure are realized as follows:

The present disclosure provides a vehicle drive assembly with transverse dual-power-source, connected to a vehicle axle half shaft, wherein the vehicle drive assembly comprises a first power source, a second power source and an automatic transmission, the automatic transmission is provided with a first input shaft and a second input shaft, the power sources are respectively connected to the two input shafts, and a differential is provided at a connection between the automatic transmission and the vehicle axle half shaft;

in the automatic transmission, a first intermediate shaft is provided parallel to the first input shaft, a second intermediate shaft is provided coaxial with the first input shaft, a third intermediate shaft is provided coaxial with the first intermediate shaft, a first clutch is provided between the first intermediate shaft and the third intermediate shaft, and a second clutch is provided between the first input shaft and the second intermediate shaft;

the first input shaft is provided with a first gear, the first intermediate shaft is provided with a second gear, and the first gear and the second gear are in engaged transmission; and the second input shaft is provided with a third gear, the second intermediate shaft is provided with a fourth gear, and the third gear and the fourth gear are in engaged transmission; and the second intermediate shaft is further provided with a fifth gear, the third intermediate shaft is provided with a sixth gear, the differential is provided with a seventh gear, the fifth gear and the sixth gear are in engaged transmission, and the sixth gear is simultaneously in engaged transmission with the seventh gear.

Optionally, the second power source is an electric motor, and when both of the first clutch and the second clutch are disengaged, the second power source transmits power to the vehicle axle half shaft via sequentially the second input shaft, the third gear, the fourth gear, the second intermediate shaft, the fifth gear, the sixth gear, the seventh gear and the differential.

Optionally, when the first clutch is engaged and the second clutch is disengaged, the first power source transmits power to the vehicle axle half shaft via sequentially the first input shaft, the first gear, the second gear, the first intermediate shaft, the first clutch, the third intermediate shaft, the sixth gear, the seventh gear and the differential.

Optionally, an engaged transmission ratio of the first gear to the second gear is i1, an engaged transmission ratio of the sixth gear to the seventh gear is i3, and when the first clutch is engaged and the second clutch is disengaged, an engaged transmission ratio in the automatic transmission is $i1 \times i3$.

Optionally, when the second clutch is engaged and the first clutch is disengaged, the first power source transmits power to the vehicle axle half shaft via sequentially the first input shaft, the second clutch, the second intermediate shaft, the fifth gear, the sixth gear, the seventh gear and the differential.

Optionally, an engaged transmission ratio of the fifth gear, the sixth gear and the seventh gear is i2, and when the second clutch is engaged and the first clutch is disengaged, an engaged transmission ratio in the automatic transmission is i2.

Optionally, an engaged transmission ratio of the third gear to the fourth gear is i4, an engaged transmission ratio of the fifth gear, the sixth gear and the seventh gear is i2, and when both of the first clutch and the second clutch are disengaged, the second power source outputs power via the automatic transmission with an engaged transmission ratio of i4×i2.

Optionally, the third intermediate shaft is further provided with an eighth gear; and the eighth gear is in engaged transmission with the fifth gear on the second intermediate shaft, and the sixth gear is in engaged transmission with merely the seventh gear.

Optionally, an engaged transmission ratio of the first gear to the second gear is i1, an engaged transmission ratio of the sixth gear to the seventh gear is i3, an engaged transmission ratio of the third gear to the fourth gear is i4, and an engaged transmission ratio of the fifth gear to the eighth gear is i5;

when the first clutch is engaged and the second clutch is disengaged, an engaged transmission ratio in the automatic transmission is i1×i3;

when the first clutch is disengaged and the second clutch is engaged, an engaged transmission ratio in the automatic transmission is i5×i3; and when both of the first clutch and the second clutch are disengaged, the second power source outputs power via the automatic transmission with an engaged transmission ratio of i4×i5×i3.

Optionally, the first power source is an electric motor or a combination of an engine and an ISG motor.

The present disclosure, by employing the above structure configurations, has the following advantages:

The vehicle power assembly of the present disclosure is connected to the rear axle half shaft or the front axle half shaft of the vehicle. The vehicle power assembly can realize dual power source input and transmission of three speed ratios, and the transmission modes and the power input mode are flexible, which satisfies the demands of the entire vehicle on travelling on different road conditions. When the vehicle is climbing a slope with a weight burden, it can select the dual power input and the larger speed ratio transmission, to increase the driving force of the entire vehicle and overcome the defect of the deficient driving force of the entire vehicle. When the entire vehicle is in the cruising condition, it can select the single power input and the smaller speed ratio transmission, to satisfy the requirement by the entire vehicle on high-speed travelling, save energy, and increase the endurance mileage of the vehicle. Furthermore, when the vehicle is starting, the first power source and the second power source are simultaneously started up, and the total driving force of the drive assembly can be increased, to shorten the acceleration process of the vehicle, to more quickly reach high-speed travelling.

The design mode of the torsion damper in combination with the contrate tooth clutches can minimize the kinetic energy loss, which overcomes the defect of too short service lives of traditional friction clutches because they cannot withstand the dynamic shock of the electric motor.

The vehicle drive assembly with transverse dual-power-source that is provided by the present disclosure, in an aspect, has a reduced longitudinal dimension, to be adapted for vehicles with a compact structure, and, in another aspect, because a small quantity of gears are used, has a simplified transmission structure.

BRIEF DESCRIPTION OF DRAWINGS

The present invention will hereinafter be described in conjunction with the following drawing figures, wherein like numerals denote like elements, and.

Figure 1:
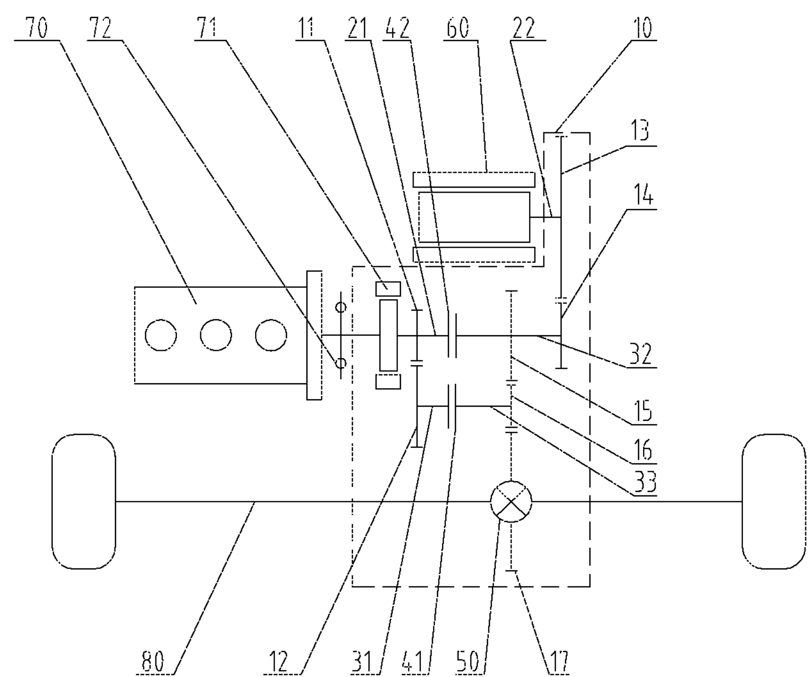
FIG. 1 is a schematic structural diagram of the vehicle drive assembly with transverse dual-power-source of the first embodiment of the present disclosure.

In the drawings: 10. automatic transmission; 11. first gear; 12. second gear; 13. third gear; 14. fourth gear; 15. fifth gear; 16. sixth gear; 17. seventh gear; 18. eighth gear;

21. first input shaft; 22. second input shaft;

31. first intermediate shaft; 32. second intermediate shaft; 33. third intermediate shaft

41. first clutch; 42. second clutch;

50. differential;

60. electric motor;

70. engine; 71. ISG motor; 72. torsion damper;

80. vehicle axle.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objects, the technical solutions and the advantages of the present disclosure clearer, the embodiments of the present disclosure will be described below in further detail in conjunction with the drawings.

The First Embodiment

As shown in FIG. 1, the first embodiment of the present disclosure provides a vehicle drive assembly with transverse dual-power-source, connected to a vehicle axle half shaft. The vehicle drive assembly comprises a first power source, a second power source and an automatic transmission 10, the automatic transmission 10 is provided with a first input shaft 21 and a second input shaft 22, the first power source and the second power source are respectively connected to the first input shaft 21 and the second input shaft 22, and a differential 50 is provided at the connection between the automatic transmission 10 and the vehicle axle half shaft.

In the automatic transmission 10, a first intermediate shaft 31 is provided parallel to the first input shaft 21, and a second intermediate shaft 32 is provided coaxial with the first input shaft 21; and a third intermediate shaft 33 is provided coaxial with the first intermediate shaft 31.

A first clutch 41 is provided between the first intermediate shaft 31 and the third intermediate shaft 33, and a second clutch 42 is provided between the first input shaft 21 and the second intermediate shaft 32.

The first input shaft 21 is provided with a first gear 11, the first intermediate shaft 31 is provided with a second gear 12, and the first gear 11 and the second gear 12 are in engaged transmission; the second input shaft 22 is provided with a third gear 13, the second intermediate shaft 32 is provided with a fourth gear 14, and the third gear 13 and the fourth gear 14 are in engaged transmission; and the second intermediate shaft 32 is further provided with a fifth gear 15, the third intermediate shaft 33 is provided with a sixth gear 16, the differential 50 is provided with a seventh gear 17, the fifth gear 15 and the sixth gear 16 are in engaged transmission, and the sixth gear 16 is simultaneously in engaged transmission with the seventh gear 17.

In the first embodiment, the first power source is the combination of an engine 70 and an ISG motor 71. In an aspect, the idle loss and pollution of the engine 70 are reduced, and in another aspect the ISG motor 71 serves as an electric generator, and can regeneratively generate electricity and recover energy, to save energy. The second power source is an electric motor 60. It can be known from the above structure that, the automatic transmission of the vehicle drive assembly of the first embodiment of the present disclosure is different from the traditional transmissions with layout mode of the input shaft, the intermediate shaft and the output shaft, which, in an aspect, has a reduced longitudinal dimension of the drive assembly, to be adapted for vehicles with a compact structure, and, in another aspect, because a small quantity of gears are used, simplifies the transmission process.

The power transmission mode of the drive assembly is as follows:

When the first clutch 41 is engaged and the second clutch 42 is disengaged, the first power source transmits power to the vehicle axle half shaft via sequentially the first input shaft 21, the first gear 11, the second gear 12, the first intermediate shaft 31, the first clutch 41, the third intermediate shaft 33, the sixth gear 16, the seventh gear 17 and the differential 50.

The engaged transmission ratio of the first gear 11 to the second gear 12 is set to i1, the engaged transmission ratio of the sixth gear 16 to the seventh gear 17 is set to i3, and when the first clutch 41 is engaged and the second clutch 42 is disengaged, the engaged transmission ratio in the automatic transmission is i1×i3. That is the first working condition.

When the second clutch 42 is engaged and the first clutch 41 is disengaged, the first power source transmits power to the vehicle axle half shaft via sequentially the first input shaft 21, the second clutch 42, the second intermediate shaft 32, the fifth gear 15, the sixth gear 16, the seventh gear 17 and the differential 50.

The engaged transmission ratio of the fifth gear 15, the sixth gear 16 and the seventh gear 17 is set to i2, and when the second clutch 42 is engaged and the first clutch 41 is disengaged, the first power source outputs power via the automatic transmission with an engaged transmission ratio of i2, and the sixth gear 16 is an idle gear. That is the second working condition.

The second power source, that is, the electric motor 60, serves as an auxiliary power source. Because the speed of the electric motor can be randomly adjusted, under the first working condition or the second working condition, if the electric motor 60 as the second power source is simultaneously started up, the driving force of the entire vehicle can be increased, and the engaged transmission ratio in the automatic transmission 10 still maintains the above ones.

When both of the first clutch 41 and the second clutch 42 are disengaged, the second power source transmits power to the vehicle axle half shaft via sequentially the second input shaft 22, the third gear 13, the fourth gear 14, the second intermediate shaft 32, the fifth gear 15, the sixth gear 16, the seventh gear 17 and the differential 50.

The engaged transmission ratio of the third gear 13 to the fourth gear 14 is set to i4, and when both of the first clutch 41 and the second clutch 42 are disengaged, the second power source outputs power via the automatic transmission with an engaged transmission ratio of i4×i2. That is the third working condition.

In the third working condition, the engine 70 may serve as an auxiliary power source, and at this point, by engaging the first clutch 41 or the second clutch 42, a larger driving force can be provided in the third working condition; and In the case that both of the first clutch 41 and the second clutch 42 are disengaged, when the first power source is started up, the power of the first power source cannot be transmitted to the vehicle axle half shaft, and the ISG motor 71 merely serves as an electric generator, and can regeneratively generate electricity, and the electric power is stored to a battery or is used to operate the second power source.

In that, the magnitudes of the transmission ratios i1, i2, i3 and i4 may be changed by changing the sizes or tooth numbers of the gears, thereby changing the transmission ratio of the automatic transmission 10. In this embodiment, the diameter of the fourth gear 14 is less than that of the fifth gear 15.

Accordingly, it can be known that, the drive assembly of the embodiment of the present disclosure can realize three transmission ratios:

When the engine 70 as the first power source is started up, the first clutch 41 is engaged, and the second clutch 42 is disengaged, the engaged transmission ratio in the automatic transmission 10 is i1×i3. At this point, the second power source may be started up or shut down. When the second power source is started up, the total driving force of the drive assembly can be increased, and when the vehicle is starting, the acceleration process of the vehicle can be shortened, to more quickly reach high-speed travelling.

When the engine 70 as the first power source is started up, the second clutch 42 is engaged, and the first clutch 41 is disengaged, the engaged transmission ratio in the automatic transmission 10 is i2. At this point, the second power source may be started up or shut down. Similarly, when the second power source is started up, the total driving force of the drive assembly can be increased.

When the electric motor 60 as the second power source is started up and the first clutch 41 and the second clutch 42 are disengaged, the engaged transmission ratio in the automatic transmission 10 is i4×i2. At this point, the engine 70 as the first power source may be started up or shut down. When the first power source is started up, the power of the first power source cannot be transmitted to the vehicle axle half shaft, and the ISG motor 71 merely serves as an electric generator, and can regeneratively generate electricity, and the electric power is stored to a battery or is used to operate the second power source.

It can be known from the above that, the vehicle drive assembly can realize dual power source input and transmission of three speed ratios, and the transmission modes are flexible, which satisfies the demands of the entire vehicle on travelling on different road conditions. When the vehicle is climbing a slope with a weight burden, it can select the dual power input and the larger speed ratio transmission, to increase the driving force of the entire vehicle and overcome the defect of the deficient driving force of the entire vehicle. When the entire vehicle is in the cruising condition, it can select the single power input and the smaller speed ratio transmission, to satisfy the requirement by the entire vehicle on high-speed travelling, save energy, and increase the endurance mileage of the vehicle. Furthermore, when the vehicle is starting, the first power source and the second power source are simultaneously started up, and the total driving force of the drive assembly can be increased, to shorten the acceleration process of the vehicle, to more quickly reach high-speed travelling.

In the embodiment of the present disclosure, the vehicle axle half shaft is a front axle half shaft or a rear axle half shaft; and when the vehicle drive assembly is connected to the front axle half shaft, the vehicle is in a front driving mode, and when the vehicle drive assembly is connected to the rear axle half shaft, the vehicle is in a rear driving mode.

The first clutch 41 and the second clutch 42 are contrate tooth clutches, comprising a movable fluted disc and a fixed fluted disc that perform engaged transmission. The movable fluted disc is provided with end face transmission teeth or tooth spaces, and the fixed fluted disc is correspondingly provided with end face tooth spaces or transmission teeth. The contrate tooth clutches, compared with friction clutches, can reduce kinetic energy loss to the largest extent, which overcomes the defect of too short service lives of traditional friction clutches because they cannot withstand the dynamic shock of the electric motor.

The drive manner of the contrate tooth clutches may be of the electromagnetically drive type (driven by electromagnet attraction), or the hydraulically drive type (driven by a hydraulic mechanism), or the pneumatically drive type (driven by a pneumatic mechanism), or the electrically drive type (driven by an electric motor), to drive the movable fluted disc to axially move to engage with the fixed fluted disc.

In the case that the first clutch 41 and the second clutch 42 are electromagnetic jaw clutches, when the vehicle drive assembly performs power input, the electromagnetic jaw clutches can enable the power and the entire vehicle to be disengaged and engaged instantly at any moment, which realizes the smooth switch of the power and increases the travelling stability of the vehicle.

The Second Embodiment

Figure 2:
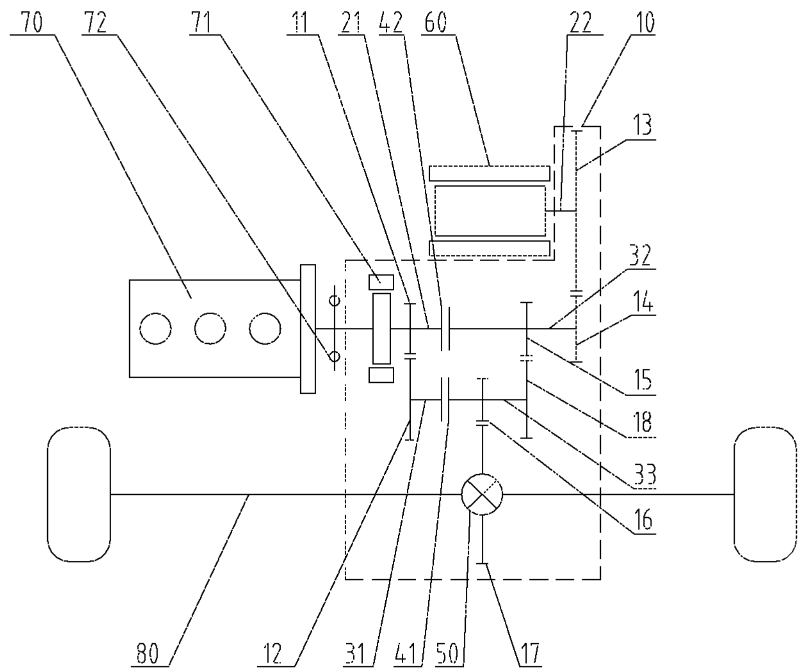
FIG. 2 is a schematic structural diagram of the vehicle drive assembly with transverse dual-power-source of the second embodiment of the present disclosure.

The second embodiment of the present disclosure is an improvement made on the basis of the first embodiment. The differences between the second embodiment and the first embodiment of the present disclosure are that, as shown in FIG. 2, the third intermediate shaft 33 is provided with an eighth gear 18, and at this point the fifth gear 15 and the eighth gear 18 are in engaged transmission; and the sixth gear 16 is merely in engaged transmission with the seventh gear 17.

The engaged transmission ratio of the fifth gear 15 to the eighth gear 18 is set to i5, the engaged transmission ratio of the sixth gear 16 to the seventh gear 17 is set to i3, and when the first clutch 41 is disengaged and the second clutch 42 is engaged, the first power source outputs power via the automatic transmission 10 with an engaged transmission ratio of $i5 \times i3$.

The engaged transmission ratio of the third gear 13 to the fourth gear 14 is set to i4, and when both of the first clutch 41 and the second clutch 42 are disengaged, the second power source outputs power via the automatic transmission 10 with an engaged transmission ratio of $i4 \times i5 \times i3$.

The different transmission ratios of the second embodiment are more flexible and under a less constraint. When a larger transmission ratio is selected, the diameters of the gears are smaller, which can effectively reduce the radial dimension of the automatic transmission.

In this embodiment, the diameter of the fourth gear 14 is greater than that of the fifth gear 15.

The other contents of the second embodiment of the present disclosure are the same as those of the first embodiment, and are not described repeatedly here.

The Third Embodiment

Figure 3:
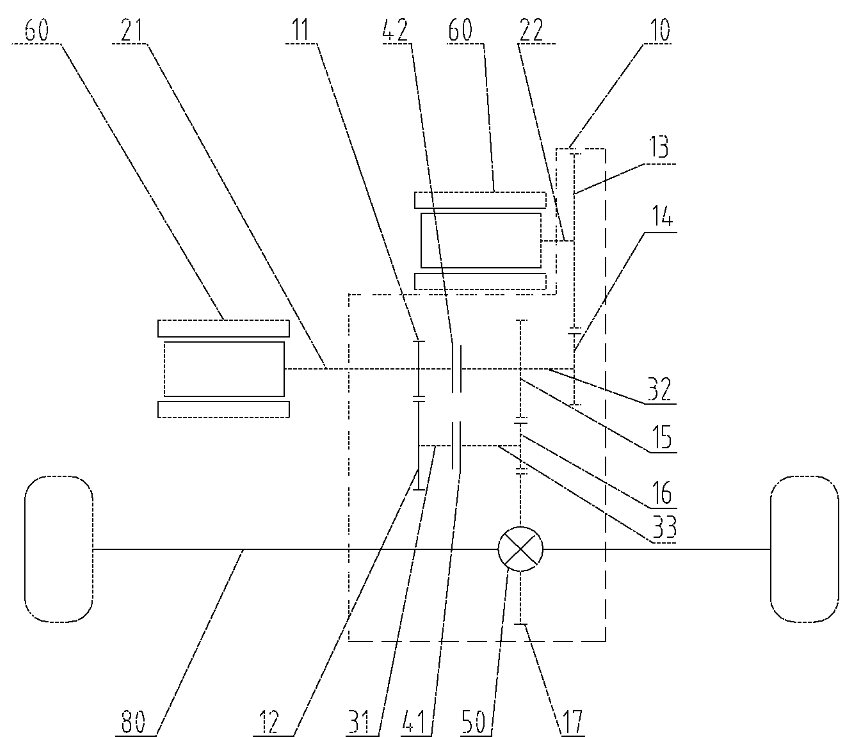
FIG. 3 is a schematic structural diagram of the vehicle drive assembly with transverse dual-power-source of the third embodiment of the present disclosure.

The third embodiment of the present disclosure is an improvement made on the basis of the first embodiment. The difference between the third embodiment and the first embodiment of the present disclosure is that, as shown in FIG. 3, in the third embodiment of the present disclosure, the first power source is the electric motor 70.

The other contents of the third embodiment of the present disclosure are the same as those of the first embodiment, and are not described repeatedly here.

The Fourth Embodiment

In the fourth embodiment of the present disclosure, as shown in FIG. 1 or 2, a torsion damper 72 is provided between the engine 70 and the ISG motor 71, and the torsion damper 72 has cushioning effect, and can reduce the torsional rigidity at a connection between the engine 70 and the ISG motor 71, thereby reducing the inherent frequency of torsional vibration and eliminating torsional vibration.

The other contents of the fourth embodiment of the present disclosure are the same as those of the first embodiment, and are not described repeatedly here.

The description above is merely particular embodiments of the present disclosure. By the foregoing teachings of the present disclosure, a person skilled in the art may make other improvements or modifications based on the foregoing embodiments. A person skilled in the art should understand that, the particular description above is merely for better interpreting the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle drive assembly with transverse dual-power-source, connected to a vehicle axle half shaft, wherein the vehicle drive assembly comprises a first power source, a second power source and an automatic transmission, the automatic transmission is provided with a first input shaft and a second input shaft, the power sources are respectively connected to the two input shafts, and a differential is provided at a connection between the automatic transmission and the vehicle axle half shaft;

in the automatic transmission, a first intermediate shaft is provided parallel to the first input shaft, a second intermediate shaft is provided coaxial with the first input shaft, a third intermediate shaft is provided coaxial with the first intermediate shaft, a first clutch is provided between the first intermediate shaft and the third intermediate shaft, and a second clutch is provided between the first input shaft and the second intermediate shaft;

the first input shaft is provided with a first gear, the first intermediate shaft is provided with a second gear, and the first gear and the second gear are in engaged transmission; and the second input shaft is provided with a third gear, the second intermediate shaft is provided with a fourth gear, and the third gear and the fourth gear are in engaged transmission;

the second intermediate shaft is further provided with a fifth gear, the third intermediate shaft is provided with a sixth gear, the differential is provided with a seventh gear, the fifth gear and the sixth gear are in engaged transmission, and the sixth gear is simultaneously in engaged transmission with the seventh gear;

when both of the first clutch and the second clutch are disengaged, the second power source transmits power to the vehicle axle half shaft via sequentially the second input shaft, the third gear, the fourth gear, the second intermediate shaft, the fifth gear, the sixth gear, the seventh gear and the differential;

when the first clutch is engaged and the second clutch is disengaged, the first power source transmits power to the vehicle axle half shaft via sequentially the first input shaft, the first gear, the second gear, the first intermediate shaft, the first clutch, the third intermediate shaft, the sixth gear, the seventh gear and the differential; and when the second clutch is engaged and the first clutch is disengaged, the first power source transmits power to the vehicle axle half shaft via sequentially the first input shaft, the second clutch, the second intermediate shaft, the fifth gear, the sixth gear, the seventh gear and the differential.

2. The vehicle drive assembly according to claim 1, wherein the second power source is an electric motor.

3. The vehicle drive assembly according to claim 1, wherein an engaged transmission ratio of the first gear to the second gear is i1, an engaged transmission ratio of the sixth gear to the seventh gear is i3, and when the first clutch is engaged and the second clutch is disengaged, an engaged transmission ratio in the automatic transmission is $i1 \times i3$.

4. The vehicle drive assembly according to claim 1, wherein an engaged transmission ratio of the fifth gear, the sixth gear and the seventh gear is i2, and when the second clutch is engaged and the first clutch is disengaged, an engaged transmission ratio in the automatic transmission is i2.

5. The vehicle drive assembly according to claim 1, wherein an engaged transmission ratio of the third gear to the fourth gear is i4, an engaged transmission ratio of the fifth gear, the sixth gear and the seventh gear is i2, and when both of the first clutch and the second clutch are disengaged, the second power source outputs power via the automatic transmission with an engaged transmission ratio of $i4 \times i2$.

6. The vehicle drive assembly according to claim 1, wherein the first power source is an electric motor or a combination of an engine and an Integrated Starter and Generator (ISG) motor.

7. The vehicle drive assembly according to claim 6, wherein the first power source is a combination of an engine and an ISG motor, and a torsion damper is provided between the engine and the ISG motor.

8. The vehicle drive assembly according to claim 1, wherein the first clutch and the second clutch are electromagnetic jaw clutches.

9. A vehicle drive assembly with transverse dual-power-source, connected to a vehicle axle half shaft, wherein the vehicle drive assembly comprises a first power source, a second power source and an automatic transmission, the automatic transmission is provided with a first input shaft and a second input shaft, the power sources are respectively connected to the two input shafts, and a differential is provided at a connection between the automatic transmission and the vehicle axle half shaft in the automatic transmission, a first intermediate shaft is provided parallel to the first input shaft, a second intermediate shaft is provided coaxial with the first input shaft, a third intermediate shaft is provided coaxial with the first intermediate shaft, a first clutch is provided between the first intermediate shaft and the third intermediate shaft, and a second clutch is provided between the first input shaft and the second intermediate shaft;

the first input shaft is provided with a first gear, the first intermediate shaft is provided with a second gear, and the first gear and the second gear are in engaged transmission; and the second input shaft is provided with a third gear, the second intermediate shaft is provided with a fourth gear, and the third gear and the fourth gear are in engaged transmission;

the second intermediate shaft is further provided with a fifth gear, the third intermediate shaft is provided with a sixth gear, the differential is provided with a seventh gear, the third intermediate shaft is further provided with an eighth gear; and the eighth gear is in engaged transmission with the fifth gear on the second intermediate shaft, and the sixth gear is in engaged transmission with merely the seventh gear.

10. The vehicle drive assembly according to claim 9, wherein an engaged transmission ratio of the first gear to the second gear is i1, an engaged transmission ratio of the sixth gear to the seventh gear is i3, an engaged transmission ratio of the third gear to the fourth gear is i4, and an engaged transmission ratio of the fifth gear to the eighth gear is i5;

when the first clutch is engaged and the second clutch is disengaged, an engaged transmission ratio in the automatic transmission is $i1 \times i3$;

when the first clutch is disengaged and the second clutch is engaged, an engaged transmission ratio in the automatic transmission is $i5 \times i3$; and when both of the first clutch and the second clutch are disengaged, the second power source outputs power via the automatic transmission with an engaged transmission ratio of $i4 \times i5 \times i3$.

11. The vehicle drive assembly according to claim 9, wherein the first power source is an electric motor or a combination of an engine and an Integrated Starter and Generator (ISG) motor; the second power source is an electric motor.

12. The vehicle drive assembly according to claim 11, wherein the first power source is a combination of an engine and an ISG motor, and a torsion damper is provided between the engine and the ISG motor.

13. The vehicle drive assembly according to claim 9, wherein the first clutch and the second clutch are electromagnetic jaw clutches.

* * * * *